UNITED STATES PATENT OFFICE 2,360,492

PROCESS OF PRODUCING ALKALI METAL AND ALKALINE EARTH METAL HYPOCHLORITES AND ALCOHOL

Clifford A. Hampel, Niagara Falls, N. Y., assignor to The Mathieson Alkali Works, Inc., New York, N. Y., a corporation of Virginia No Drawing. Application June 24, 1942, Serial No. 448,319

8 Claims. (Cl. 23—86)

This invention relates to improvements in the manufacture of metal hypochlorites such as calcium hypochlorite. It relates more particularly to improvements in the process of manufacturing such hypochlorites involving the reacting of alkyl hypochlorites with a base, such as an alkali or alkaline earth metal base, to form the corresponding metal hypochlorite.

In the United States Patent No. 1,632,483 there is described a method of producing metal hypochlorites of high purity by reacting a base such as lime with alkyl hypochlorites in the liquid phase, preferably tertiary alkyl hypochlorites. The complete process described in said patent, as applied to the manufacture of calcium hypochlorite, comprises the following steps: (1) the preparation of an aqueous solution containing hypochlorous acid and calcium chloride; (2) separation of hypochlorous acid from the aqueous solution and the chloride in the form of a tertiary alkyl hypochlorite by treatment with a tertiary alcohol; (3) treatment of the separated tertiary alkyl hypochlorite in the liquid phase with lime to form calcium hypochlorite.

The present invention contemplates an improvement in the process described in said patent and relates primarily to an improved method of carrying out the said third step of such process. However, the present invention is applicable to the conversion of alkyl hypochlorites to hypochlorites of the alkali-forming or base-forming metals whatever the source of the alkyl hypochlorite. The present invention is also applicable to the use of alkyl hypochlorites other than the tertiary alkyl hypochlorites.

According to the process described in said patent, the alkyl hypochlorite, after separation from the aqueous layer in the second step of the process, is dissolved in a solvent such as the alcohol used in preparing the alkyl hypochlorite in the second step of the process, and in which water is soluble, and a quantity of water added to the solution either before, after or while adding and mixing the lime therewith.

Also, in United States Patent No. 1,632,485 there is described a similar process according to which the alkyl hypochlorite in the liquid phase is reacted with the base material in the presence of sufficient water to dissolve the metal hypochlorite formed. The metal hypochlorite thus formed is recovered by the evaporation of the solution and the product is then dried.

Where the alkyl hypochlorite is treated with lime, the reaction may be illustrated by the following type equation:

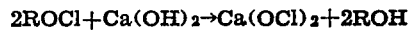

$$2ROCl + Ca(OH)_2 \rightarrow Ca(OCl)_2 + 2ROH$$

in which R is an alkyl radical.

An objection to the process wherein the metal hypochlorite is formed in the presence of an alcohol solvent is that it involves the handling of relatively large quantities of the solvent. An objection to the process wherein the metal hypochlorite is formed in the presence of sufficient water to dissolve the metal hypochlorite formed is the necessity of separating the metal hypochlorite product from relatively large volumes of water, for instance by evaporation. Each is subject to the further objection that a separate operation is required for the separation and recovery of the alcohol formed by the reaction. In the former it has been necessary to separate from the product and the water present relatively large volumes of the alcohol or other solvent including that added as such and the alcohol formed by the reaction. In the latter method of operation it has been necessary to separate alcohol formed by the reaction from the product and from the relatively large quantities of water required to dissolve the metal hypochlorite.

I have discovered that the alkyl hypochlorite in the vapor phase will readily react with bases such as lime to form the corresponding metal hypochlorite, the alcohol being formed as vapors as the reaction proceeds.

The reaction of the base material with the alkyl hypochlorite to form the corresponding metal hypochlorite is effected in accordance with this invention by intimately contacting the alkyl hypochlorite vapors with the base. The base material is preferably in a finely-divided solid form. The presence of a small amount of water is desirable to promote the hydrolysis but for this purpose only a few percent, say about 5%, of the lime by weight will suffice.

The invention is applicable not only to the reacting of an alkyl hypochlorite with a base to form the corresponding metal hypochlorite but also to the further hypochloriting of basic hypochlorites such as dibasic calcium hypochlorite.

In accordance with my improved method of operation, no solvent such as alcohol and no substantial amounts of water are charged to the zone of reaction. Accordingly, the amount of liquids to be handled is greatly reduced and the handling of the solids involved is simplified.

The contacting of the alkyl hypochlorite vapors with the base material may be effected, for instance, by passing the vapors uniformly through a body of the base material such as a bed thereof suspended in a suitable chamber, or through a tube loosely filled with the base material. However, the invention is admirably adapted to continuous operation wherein the solid base material is continuously fed downwardly through a reactor countercurrent to a stream of alkyl hypochlorite vapors and from which the solid metal hypochlorite is continuously withdrawn. The alcohol formed by the reaction is also continuously withdrawn from the reactor as a vapor and may be reconverted to alkyl hypochlorites by known methods and returned to the reactor to be contacted with further base material.

The alkyl hypochlorite may be vaporized prior to being brought into contact with the base material by subjecting it to a temperature below that at which it decomposes at sub-atmospheric pressure or it may be vaporized by passing an inert gas such as air or nitrogen through the liquid alkyl hypochlorite so that a mixture of inert gas and alkyl hypochlorite vapors is formed. When operating at subatmospheric pressure, the vaporization and removal of the alcohol formed by the reaction is aided by the low pressure and when any inert carrier gas is used, the alcohol is carried off from the reaction zone by the inert carrier gas. If desired, the use of sub-atmospheric pressure and an inert carrier gas may be combined, and such is particularly advantageous where an alkyl hypochlorite of relatively high boiling point is used, in order to reduce the vaporizing temperature to below that at which decomposition of the hypochlorite might result.

In general, the tertiary alkyl hypochlorites such as those derived from tertiary butyl and tertiary amyl alcohol are more stable than other alkyl hypochlorites such as those obtained from the primary and secondary alcohols and are, therefore, better adapted to use in accordance with this invention. However, the invention is applicable to the use of other alkyl hypochlorites including mixed alkyl hypochlorites such as derived from mixed alcohols.

The small amount of water needed for the hydrolysis of the alkyl hypochlorites and a base material such as lime may also be supplied to the reaction zone in the vapor phase or a base material containing a small amount of moisture may be used. Where an inert carrier gas is used, such gas may be charged with the required amount of water by passing it through or over water prior to charging it with the alkyl hypochlorite vapors or such carrier gas may be passed through or over a mixture of water and liquid alkyl hypochlorite prior to its introduction to the reaction zone.

A small amount of water charged to the reaction zone is retained in the metal hypochlorite product, possibly as water of crystallization, but the amount of water in the product is seldom more than about 20% by weight, which is substantially less than that remaining in the product produced by any other method of which I am aware. Accordingly, the time and heat required to dry the product is substantially reduced.

When basic hypochlorites such as dibasic calcium hypochlorite are to be further hypochlorited, in accordance with my present invention, by treatment with alkyl hypochlorite vapors, it is usually unnecessary to supply any water as such to the reaction zone, as the basic hypochlorites generally carry sufficient water of crystallization or adhering water. However, some water may be supplied where required without excessively increasing the water content of the product.

As previously indicated, the presence of any substantial amount of water during the reaction between a base such as lime and an alkyl hypochlorite such as tertiary butyl hypochlorite is not necessary as the reaction will proceed where only traces of water are present. However, the presence of larger amounts of water, for instance up to about 10% or more by weight of the lime, considerably increases the rate and extent of the reaction and its presence is therefore desirable.

The temperature at which the reaction is effected is not critical but is limited by that temperature at which the alkyl hypochlorite begins to decompose. This temperature varies with the individual hypochlorite used. I have found that a temperature of 45° C. is not excessive for the reaction of tertiary butyl hypochlorite with lime or basic hypochlorites. In determining the temperature to be used in any particular operation, the temperature at which the calcium or other metal hypochlorite decomposes must also be considered and the reaction temperature should be maintained below this point. Generally, it has been found desirable to maintain the reactor temperature within the range between 0° C. to 50° C.

The invention may be utilized to advantage in a cyclic process such as described in the previously referred to U. S. Patent No. 1,632,483, for example a cyclic process as applied to the manufacture of calcium hypochlorite comprising the following steps:

1. The preparation of alkyl hypochlorites by chlorination of NaOH or Ca(OH)$_2$ in aqueous solution or suspension in the presence of an alcohol;

2. Separation of the alkyl hypochlorite thus formed from the water solution by decantation or the like;

3. Vaporizing the alkyl hypochlorite, reacting the vapors with lime and withdrawing alcohol vapors from the reaction zone as formed;

4. Condensing the alcohol vapors withdrawn from the eraction zone and returning the alcohol to the first step of the process for re-use in the preparation of additional alkyl hypochlorite.

Any alkyl hypochlorite which escapes reaction with the base material passes from the reaction zone together with the alcohol vapors and may be condensed and recycled with the alcohol to the first step of the process wherein additional alkyl hypochlorite is formed. However, if desired, such unreacted alkyl hypochlorite may be separated from the alcohol and returned directly to the reaction zone.

The invention will be further illustrated by means of the following specific examples of its use in the production of calcium hypochlorite. It will be understood, however, that the invention is also applicable to the production of hypochlorites of alkali or other base-forming metals. In each case, the proportions indicated are by weight.

*Example I*

Calcium hypochlorite was prepared by treating lime with tertiary butyl hypochlorite vapors as follows:

10 parts of lime were placed in a tube so designed that a current of vapors could be passed therethrough. Over a period of several hours 42 parts of 93% tertiary butyl hypochlorite was passed through the lime carried by a current of air humidified by passage through water. Thereafter, the contents of the tube were found by analysis to contain 59.2% Ca(OCl)₂, 22.8% Ca(OH)₂ and 18% water. The temperature used in carrying out this reaction was approximately 25° C.

*Example II*

Calcium hypochlorite was prepared by further hypochloriting dibasic calcium hypochlorite, having approximately the formula:

$$Ca(OCl)_2 \cdot 2Ca(OH)_2$$

and containing about 15% water, as follows:

10 parts of the dibasic calcium hypochlorite were treated in the same manner as described in Example I with 33.6 parts of 93% tertiary butyl hypochlorite but without adding further water. The product was found by analysis to contain by weight 66% Ca(OCl)₂, 17.24% Ca(OH)₂, 14.66% water and 2.1% CaCl₂.

*Example III*

28 parts of dibasic calcium hypochlorite of the same composition as that used in Example II were treated at a temperature of 35° C. to 45° C. with 84 parts of 93% tertiary butyl hypochlorite and 15 parts of water, both in the vapor phase. The product was found by analysis to contain by weight 63.7% Ca(OCl)₂, 15.4% Ca(OH)₂, 18.6% water and 2.3% CaCl₂.

I claim:

1. In the process of producing metal hypochlorites by reacting an alkali or alkaline earth metal basic material with an alkyl hypochlorite with the concurrent formation of alcohol and the metal hypochlorite, the improvement which comprises reacting the basic material with the alkyl hypochlorite in the vapor phase and separating the alcohol as vapor from the resultant metal hypochlorite.

2. In the process of producing metal hypochlorites by reacting an alkali or alkaline earth metal basic material with an alkyl hypochlorite with the concurrent formation of alcohol and the metal hypochlorite, the improvement which comprises reacting the basic material with the alkyl hypochlorite in the vapor phase in the presence of only a minor proportion of water and separating the alcohol as vapor from the resultant metal hypochlorite.

3. In the process of producing metal hypochlorites by reacting an alkali or alkaline earth metal basic material with an alkyl hypochlorite with the concurrent formation of alcohol, the improvement which comprises reacting the basic material with the alkyl hypochlorite in the vapor phase and removing the alcohol as vapor from the zone of reaction as formed.

4. In the process of producing calcium hypochlorites by reacting lime with an alkyl hypochlorite with the concurrent formation of alcohol, the improvement which comprises reacting the lime with the alkyl hypochlorite in the vapor phase and removing the alcohol as vapor from the reaction zone as formed.

5. In the process of producing metal hypochlorites by reacting lime with a tertiary alkyl hypochlorite with the concurrent formation of tertiary alcohol, the improvement which comprises reacting the lime with the tertiary alkyl hypochlorite in the vapor phase and removing the tertiary alcohol as vapor from the zone of reaction as formed.

6. In the process of producing metal hypochlorites by reacting lime with a tertiary butyl hypochlorite with the concurrent formation of tertiary butyl alcohol, the improvement which comprises reacting the lime with the tertiary butyl hypochlorite in the vapor phase and removing the tertiary butyl alcohol as vapor from the zone of reaction as formed.

7. In the process of producing calcium hypochlorites by reacting lime with an alkyl hypochlorite with the concurrent formation of alcohol, the improvement comprising continuously passing alkyl hypochlorite vapors through a reaction zone, continuously charging lime to the reaction zone so as to pass in contact with and countercurrent to the alkyl hypochlorite vapors and continuously removing from the reaction zone alcohol vapors and solid calcium hypochlorite formed by the reaction.

8. In the process of producing calcium hypochlorites by reacting lime with an alkyl hypochlorite with the concurrent formation of alcohol, the improvement comprising continuously passing alkyl hypochlorite vapors through a reaction zone, continuously charging lime to the reaction zone so as to pass in contact with and countercurrent to the alkyl hypochlorite vapors, continuously removing from the reaction zone alcohol vapors and solid calcium hypochlorite formed by the reaction, reconverting the alcohol removed from the zone of reaction to alkyl hypochlorite and passing the resultant alkyl hypochlorite in vapor phase to the zone of reaction.

CLIFFORD A. HAMPEL.